United States Patent
Byrne et al.

(10) Patent No.: US 10,489,189 B2
(45) Date of Patent: Nov. 26, 2019

(54) SELECTION OF MAINTENANCE TASKS

(71) Applicant: International Business Machines Corporation, Armonk, NY (US)

(72) Inventors: Patrick J. Byrne, Manchester (GB); Josu Diaz de Arcaya, Manchester (GB); Vernon W. Miller, Tucson, AZ (US); Richard A. Welp, Manchester (GB); James B. Wormwell, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 15/436,193

(22) Filed: Feb. 17, 2017

(65) Prior Publication Data
US 2018/0239685 A1 Aug. 23, 2018

(51) Int. Cl.
*G06F 9/455* (2018.01)
*G06F 9/48* (2006.01)
(Continued)

(52) U.S. Cl.
CPC ............... *G06F 9/48* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45562; G06F 9/48;
(Continued)

(56) References Cited

U.S. PATENT DOCUMENTS

| 7,409,316 B1 | 8/2008 | Saghier et al. |
| 2008/0072232 A1* | 3/2008 | O'Toole ............ G06F 9/505 |
| | | 718/104 |

(Continued)

FOREIGN PATENT DOCUMENTS

WO  WO 2013/011280 A2  1/2013

OTHER PUBLICATIONS

"EMC CLARiiON Best Practices for Performance and Availability: Release 30.0 Firmware Update", EMC Corporation, https://www.emc.com/collateral/hardware/white-papers/h5773-clariion-best-practices-performance-availability-wp.pdf, Applied Best Practices, Mar. 2011, 122 pages.

*Primary Examiner* — Charles M Swift
(74) *Attorney, Agent, or Firm* — Stephen R. Tkacs; Stephen J. Walder, Jr.; Robert M. Sullivan

(57) ABSTRACT

A computer-implemented mechanism is provided that monitors usage of one or more computing resources within a set of computing components relative to a received workload. The mechanism calculates a maximum workload for the set of computing components from the monitored use of the computing resources within the set of computing components and determines an available overhead between the calculated maximum workload for the set of computing components and a current workload being performed by the set of computing components. The mechanism selects one or more maintenance tasks for the set of computing components, the total workload of the selected maintenance tasks being less than the determined available overhead.

15 Claims, 6 Drawing Sheets

(51) Int. Cl.
   *G06F 9/50*    (2006.01)
   *G06F 11/34*   (2006.01)
   *G06F 11/30*   (2006.01)
   *G06F 11/32*   (2006.01)

(52) U.S. Cl.
   CPC ......... *G06F 9/45558* (2013.01); *G06F 9/485* (2013.01); *G06F 9/4806* (2013.01); *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5027* (2013.01); *G06F 9/5044* (2013.01); *G06F 9/5055* (2013.01); *G06F 9/5061* (2013.01); *G06F 9/5072* (2013.01); *G06F 9/5083* (2013.01); *G06F 11/3006* (2013.01); *G06F 11/3024* (2013.01); *G06F 11/322* (2013.01); *G06F 11/3414* (2013.01); *G06F 2009/45562* (2013.01); *G06F 2209/508* (2013.01)

(58) Field of Classification Search
   CPC ...... G06F 9/4806; G06F 9/4843; G06F 9/485; G06F 9/4881; G06F 9/50; G06F 9/5005; G06F 9/5011; G06F 9/5016; G06F 9/5027; G06F 9/5044; G06F 9/505; G06F 9/5055; G06F 9/5061; G06F 9/5072; G06F 9/5083
   See application file for complete search history.

(56) References Cited

U.S. PATENT DOCUMENTS

| | | | |
|---|---|---|---|
| 2008/0172671 A1* | 7/2008 | Bouillet | G06F 11/3447 718/104 |
| 2008/0216087 A1* | 9/2008 | Dillenberger | G06F 9/505 718/105 |
| 2010/0146515 A1* | 6/2010 | Shpigelman | G06F 9/4881 718/104 |
| 2010/0169253 A1* | 7/2010 | Tan | G06F 9/5088 706/21 |
| 2010/0318608 A1* | 12/2010 | Huang | G06F 9/4856 709/205 |
| 2011/0307896 A1* | 12/2011 | Kruckenberg | G06F 9/4887 718/102 |
| 2013/0205005 A1* | 8/2013 | Ashok | G06F 15/17 709/224 |
| 2013/0227379 A1 | 8/2013 | Gupta et al. | |
| 2014/0082626 A1* | 3/2014 | Busaba | G06F 9/38 718/104 |
| 2014/0095544 A1 | 4/2014 | Eshel et al. | |
| 2014/0122722 A1* | 5/2014 | Farchi | G06F 9/5061 709/226 |
| 2015/0058475 A1* | 2/2015 | Earl | H04L 47/741 709/224 |
| 2015/0143364 A1* | 5/2015 | Anderson | G06F 9/5088 718/1 |
| 2015/0150015 A1* | 5/2015 | Fankhauser | G06F 9/4881 718/103 |
| 2015/0312342 A1 | 10/2015 | Gunda et al. | |
| 2016/0378523 A1* | 12/2016 | Abali | G06F 9/467 718/1 |

* cited by examiner

SELECTION OF MAINTENANCE TASKS

BACKGROUND

The present invention relates to a computer implemented method, a system and a computer program product for efficiently selecting maintenance tasks for use on a set of computing components.

A computer cluster consists of a set of loosely or tightly connected computers that work together so that, in many respects, they can be viewed as a single system. Unlike grid computers, computer clusters have each node set to perform the same task, controlled and scheduled by software. The components of a cluster are usually connected to each other through fast local area networks (LANs), with each node (computer used as a server) running its own instance of an operating system. In most circumstances, all of the nodes use the same hardware and the same operating system, although in some setups, different operating systems can be used on each computer, and/or different hardware.

Computer clusters are usually deployed to improve performance and availability over that of a single computer, while typically being much more cost-effective than single computers of comparable speed or availability.

Computer clusters emerged as a result of convergence of a number of computing trends including the availability of low-cost microprocessors, high speed networks, and software for high-performance distributed computing. They have a wide range of applicability and deployment, ranging from small business clusters with a handful of nodes to some of the fastest supercomputers.

SUMMARY

According to one illustrative embodiment, there is provided a computer implemented method comprising monitoring the use of one or more computing resources within a set of computing components relative to a received workload, calculating a maximum workload for the set of computing components from the monitored use of the computing resources within the set of computing components, determining an available overhead between the calculated maximum workload for the set of computing components and a current workload being performed by the set of computing components, and selecting one or more maintenance tasks for the set of computing components, the total workload of the selected maintenance tasks being less than the determined available overhead.

According to another illustrative embodiment, there is provided a system comprising a processor arranged to monitor the use of one or more computing resources within a set of computing components relative to a received workload, calculate a maximum workload for the set of computing components from the monitored use of the computing resources within the set of computing components, determine an available overhead between the calculated maximum workload for the set of computing components and a current workload being performed by the set of computing components, and select one or more maintenance tasks for the set of computing components, the total workload of the selected maintenance tasks being less than the determined available overhead.

According to another illustrative embodiment, there is provided a computer program product for controlling a system, the computer program product comprising a computer readable storage medium having program instructions embodied therewith, the program instructions executable by a processor to cause the processor to monitor the use of one or more computing resources within a set of computing components relative to a received workload, calculate a maximum workload for the set of computing components from the monitored use of the computing resources within the set of computing components, determine an available overhead between the calculated maximum workload for the set of computing components and a current workload being performed by the set of computing components, and select one or more maintenance tasks for the set of computing components, the total workload of the maintenance tasks being less than the determined available overhead.

BRIEF DESCRIPTION OF THE SEVERAL VIEWS OF THE DRAWINGS

Illustrative embodiments of the present invention will now be described, by way of example only, with reference to the following drawings, in which.

DETAILED DESCRIPTION

Figure 1:
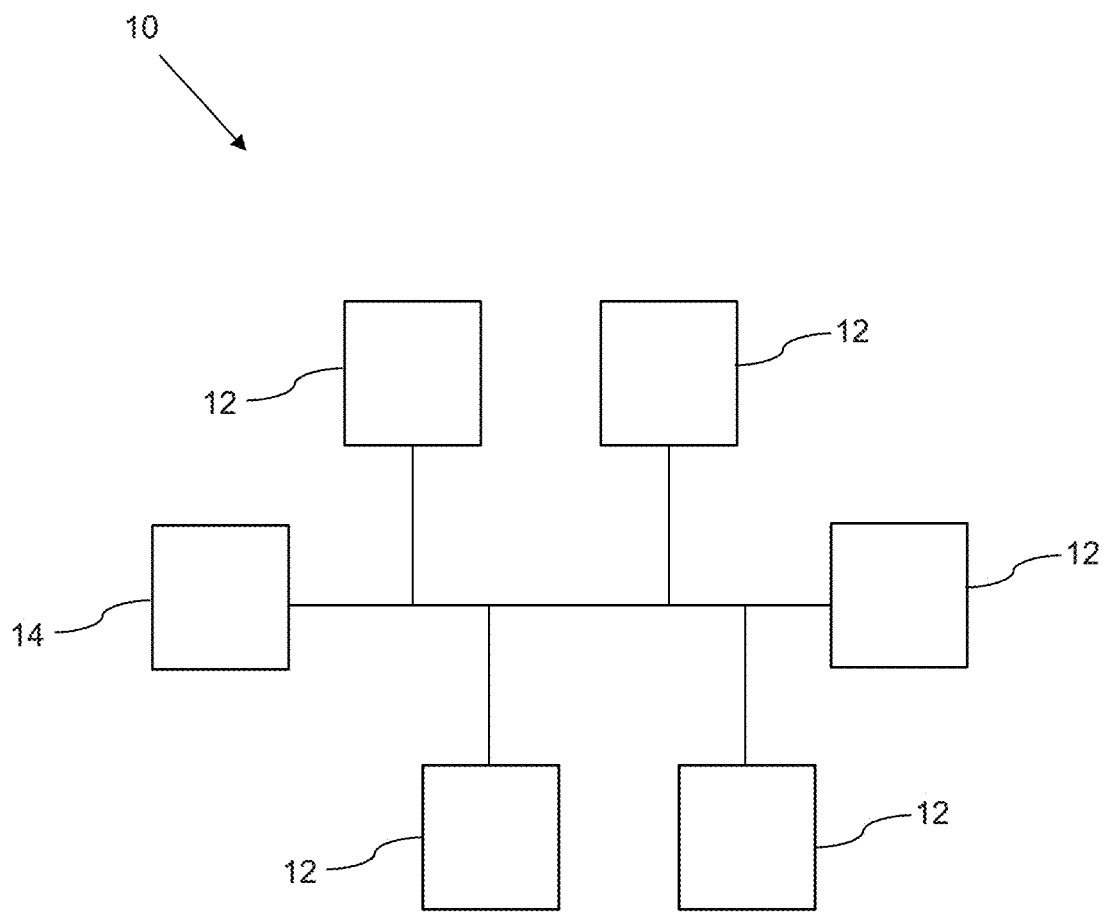
FIG. 1 is a schematic diagram of a set of computing components in accordance with an illustrative embodiment.

FIG. 1 is a schematic diagram of a set of computing components in accordance with an illustrative embodiment. FIG. 1 shows a system that comprises a set 10 of computing components 12 and also includes a management component 14. The computing components 12 together form a computer cluster that is set up to deliver a defined service to one or more customers. For example, the set 10 could be a memory management system that is linked to a web service, with the different computing components 12 being memory components and processing components that are interconnected via one or more computing busses. The different components 12 that form the set 10 may each be different individual hardware components or could be software components that are located on the same hardware or a combination of the two arrangements. Multiple hardware components can also be considered to be a single computing component. The management component 14 is an independent computing system designed to co-ordinate the operation of the overall set 10 of components 12.

A workload is received by the set 10 of computing components 12, which continually varies over time. The current workload is the workload being carried out at a specific moment in time. As new work arrives and existing work is completed, the workload varies over time. The workload may be generated by external components that communicate with one or more components within the set 10 of computing components 12. For example, an individual interacting with a remote client device to initiate a financial transaction will result in numerous transactions being carried out by the set 10 of computing components 12, all of which comprise part of the current workload of the set 10.

For a large financial organization such as an international bank, the workload of the set 10 of computing components 12 will be very large and will be constantly changing over time depending upon such factors as bank opening hours and the current time in different locations. The set 10 of computing components 12 must have a very high level of data security and reliability and for this reason maintenance tasks will need to be carried out periodically on the set 10 of computing components 12. These maintenance tasks may be generated by the set 10 itself or may be triggered by the action(s) of an administrator. Data backups are one type of maintenance task.

Efficiently managing tasks in a clustered system, such as that shown in FIG. 1, is very important. In many computing environments, the ability to manage the system versus maintaining high levels of normal IO (input/output operation) is a delicate balancing act. In many instances, the underlying maintenance tasks, which are vital to the health of the system, are run at a cost to the system which may result in a reduced capacity for customer workloads. In many instances there are ways of controlling an upper limit of available resources that a process or a set of processes can use. This methodology ensures no major regression of a system, but it may lead to a sub-optimal result when maintenance tasks are run during periods of busy user IO.

Figure 2:
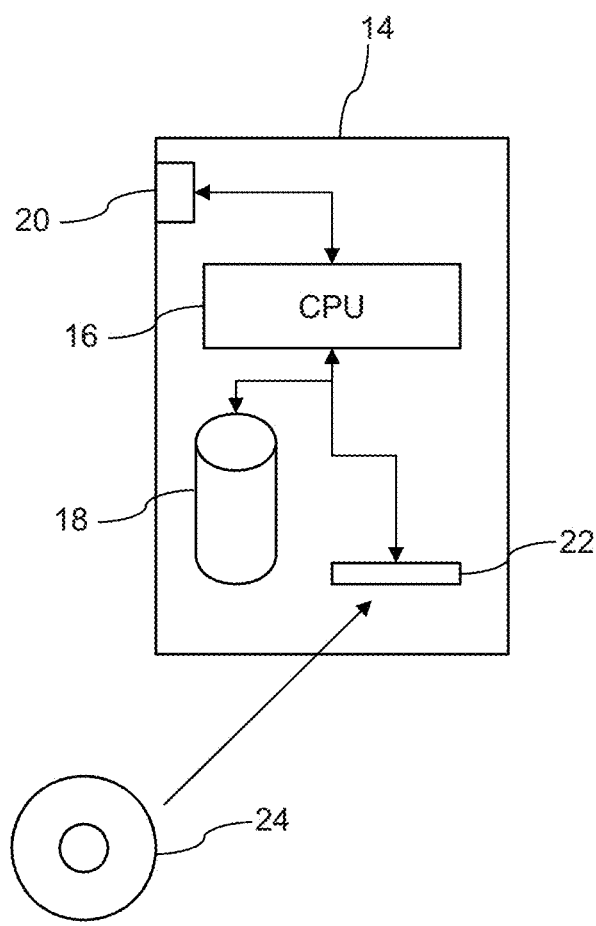
FIG. 2 is a schematic diagram of a management component in accordance with an illustrative embodiment.

The management component 14, shown in more detail in FIG. 2, is a component within the system that will monitor the system for known limitations. The component 14 will track the upper limits of the system and will be able to track which commands and/or processes are resource intensive. The component 14 will be able to differentiate critical customer workloads versus system maintenance processes and will manage the system to ensure that customer workloads are not affected by known impactful system processes. The management component 14 comprises a processor 16 and a storage device 18 that is connected to the processor (central processing unit (CPU)) 16. The component 14 also comprises a network interface 20 that is connected to the processor 16 and connects externally to a bus of the system, in order to communicate with the computing resources 12. The component 14 also comprises a local interface 22 for receiving a CD-ROM 24. The CD-ROM 22 is a computer program product for controlling the management component 14 and comprises a computer readable storage medium having program instructions embodied therewith, the program instructions executable by the processor 16.

This component 14 is initialized in the computing environment by tracking usage and throughputs of the environment as the overall system is being used. Naturally, a system will not be put into 100% utilized environment during initial start-up, and this component 14 is able to extrapolate the given values based on system variables. As the component 14 learns the baseline of maximum capabilities the component 14 will then start with a default profile for reducing resources for the system tasks. As the computing environment grows or ages, the component 14 will continue to track maximum capabilities and will adjust the maintenance limitations over time. For instance, if more capacity is added through higher-bandwidth network links, or more and or faster disks, the component 14 will be able to detect this and will be able to adjust how much resource can be used in by maintenance systems.

Once a cluster, such as that shown in FIG. 1, is built and configured, the management component 14 will be initialized, and will run a given set of tests on the system. For example, the management component 14 will track the use of computing resources in the system through attributes such as the overall data throughput of the cluster, the number of maximum input/output operations per second (IOPs) the system can execute, and overall latency of IOPs in the system. The estimated maximum will take system environment calculations for the given attribute and cluster configuration to determine what the theoretical maximum is given how the baseline profile executed. The management component 14 monitors the use of the computing resources 12 within the system and calculates a maximum workload for the system.

Figure 3:
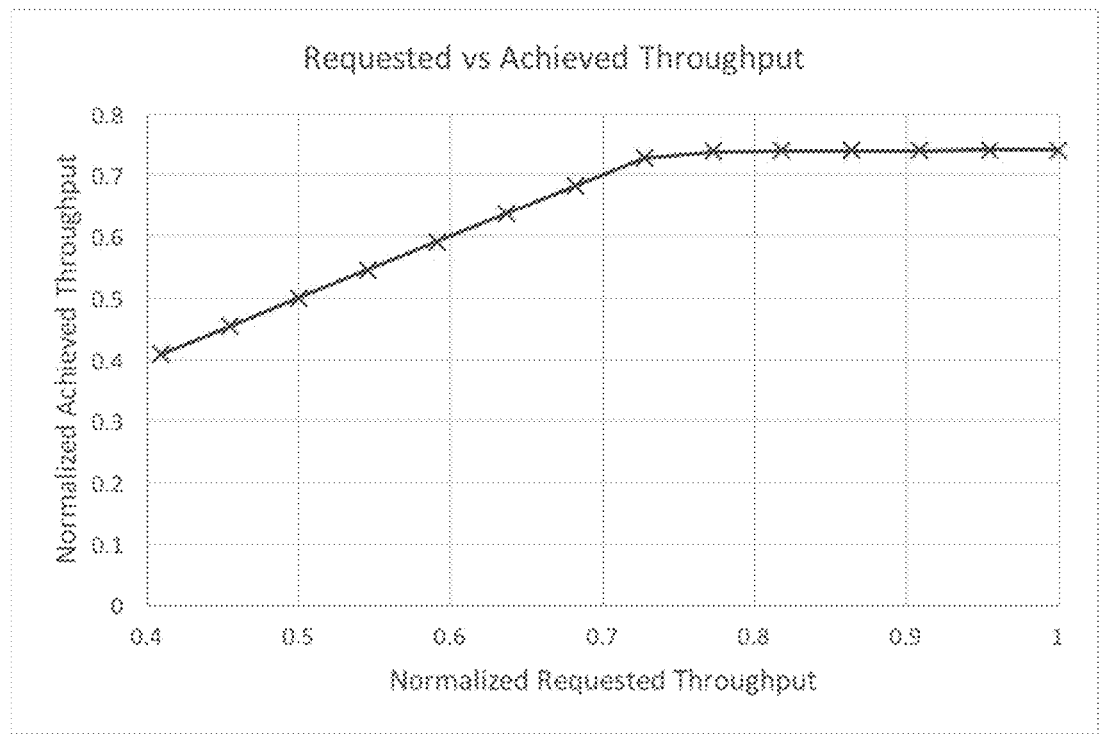
FIG. 3 is a chart showing system performance in accordance with an illustrative embodiment.
Figure 4:
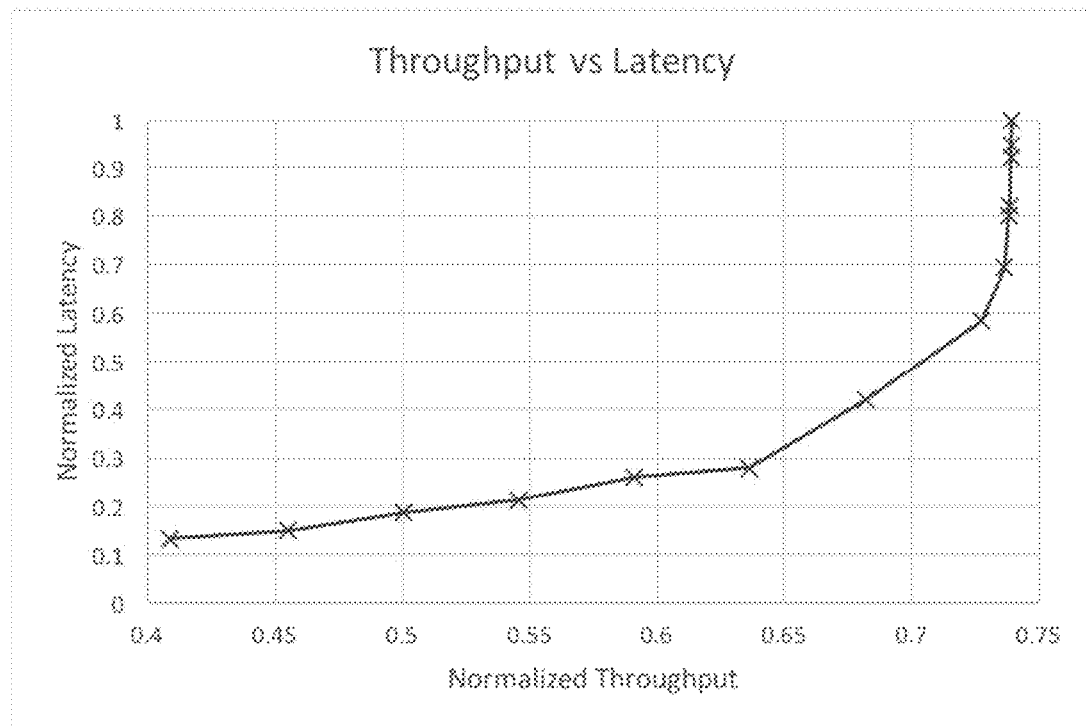
FIG. 4 is a chart showing system latency in accordance with an illustrative embodiment.

The charts of FIGS. 3 and 4 show standard normalized performance profiles for the system of FIG. 1 in relation to specific attributes, which indicate the use of computing resources within the computing components 12. As can be seen, the performance of the system is consistent for a specific workload and set of code. The chart of FIG. 3 shows IOPs requested (x-axis) against IOPs achieved (y-axis). It can be seen from this chart that as the amount of IOPs approaches a normalised throughput value of 0.75, the system is able to process the same amount of IOPs, but once this value is reached, the performance of the system degrades. The chart of FIG. 4 shows IOPs requested (x-axis) against latency (y-axis), where latency is essentially the delay in an operation being processed. Again, once the system reaches a normalised throughput value of 0.75, the performance of the system is noticeably worse, with latency increasing sharply.

Based on these characteristics, the management component 14 can determine where in the cluster the best IO throughput can be achieved and the best system latency can be achieved. The charts shown in FIGS. 3 and 4 represent a system where the (normalised) maximum throughput is 0.75 before the IOPs degrade based on overloading the system. In the vast majority of cases, the IOPs requested versus IOPs achieved is linear until the maximum is reached. In the case of latency, the J curve is the typical response from the system. Once the bottom of the J curve has been realized, the best performing IOPs requested value can be determined. Using basic calculations, the management component 14 will be able to tell where on the performance profile the system is, and how much the system should be able to increase before reaching the maximum capacity of the system.

The management component 14 will continuously monitor the system to ensure that if a configuration changes in the environment the maximum performance profile is re-evaluated. Once a change is realized in the cluster, the management component 14 once again tracks the system's performance to ensure that management component 14 understands the capabilities of the cluster, and re-evaluates the performance profile. For instance, if more hard drives are added to the cluster, the management component 14 notices this and if the previous bottleneck in the cluster was the disks, the management component 14 understands this and updates the performance profile. The management component 14 continues to monitor the performance of the system over time.

The management component 14 will also start with a set of default tasks that will need to be managed to ensure the tasks do not impact the capacity of customer tasks in the cluster. The management component 14 will have a baseline for an amount of degradation the system is allowed to experience by these system tasks. The management component 14 will be set with a default degradation, for example 5%, but this can be adjusted by the customer depending on their workloads requirements. For example, it might be imperative that a restripe of the filesystem is executed.

Because of this, the customer may be willing to accept a higher performance degradation to ensure their maintenance work is complete, and the customer will have the ability to increase the percentage of reduced capacity of the system all of the way to the maximum, which will enable the task to use the maximum resources available to continue to achieve the optimal results.

When a maintenance task is initialized, the task will execute on the system, and the task will be able to consume resources and create impacts on the cluster up to the limits set by the management component 14. For instance if there is a scheduled snapshot command (a form of memory backup), this command may be marked as an impactful system command, and therefore subject to thresholding. As the command runs, the management component 14 will track overall throughput of the cluster and will ensure that the snapshot command does not cause impact to the system greater than the permitted degradation. If the task starts to hit the limits, the operation of the task will be managed by the management component 14 by reducing the task's ability to consume resources. If the command never affects the cluster's workload up to the limits set, the task will be able to run with its maximum capacity. If managed tasks are executed during periods of low customer workloads, the ability for managed task to consume more resources is available when compared to being run during highly utilized periods. For example, a snapshot run during peak customer activity periods would be able to use a considerably smaller amount of resources when compared to low periods of customer workloads.

Figure 5:
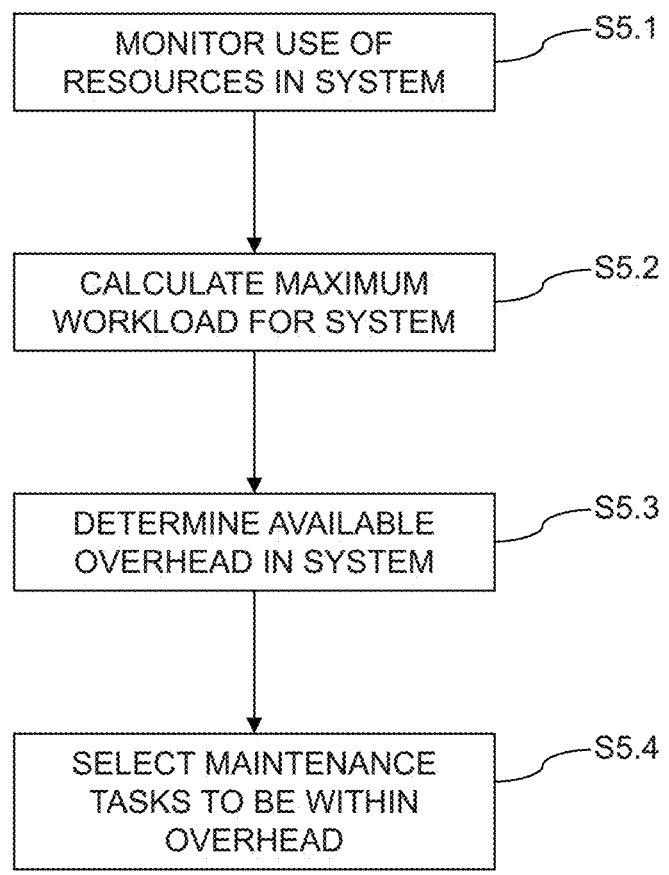
FIG. 5 is a flowchart illustrating operation of selecting maintenance tasks in accordance with an illustrative embodiment.

FIG. 5 shows a flowchart that summarises the operation of the management component 14 in relation to the selecting of maintenance tasks within the system. The first step of the method is step S5.1, which comprises monitoring the use of one or more computing resources within a set 10 of computing components 12 relative to a received workload. Computing resources used can be CPU cycles, bus bandwidth, memory space, and so on, and the use of these resources can be measured through the monitoring of attributes or parameters such as data latency and IOPs. The received workload is essentially the current workload that is being processed by the set 10 of computing components 12.

The next step in the method is step S5.2, which comprises calculating a maximum workload for the set 10 of computing components 12 from the monitored use of the computing resources within the set 10 of computing components 12. The maximum workload can be calculated in a number of different ways, but one simple method is to set a limit on a measured parameter such as latency and define the maximum workload as the workload that would exceed this limit for the system latency, which workload is either directly measured or extrapolated from the monitored performance of the overall set 10 of components 12, as discussed above with reference to the charts of FIGS. 3 and 4.

The next step in the method is step S5.3, which comprises determining an available overhead between the calculated maximum workload for the set of computing components and a current workload being performed by the set of computing components. The available overhead, in the simplest case will be the exact difference between the current workload and the maximum workload, but stricter or more relaxed conditions could be used. For example, the available overhead may be set at a level that is less than the difference between the calculated maximum workload and the current workload (implying a stricter condition) or may be more than the difference between the calculated maximum workload and the current workload (implying a more relaxed condition).

The final step in the method is step S5.4, which comprises selecting one or more maintenance tasks for the set 10 of computing components 12, the total workload of the selected maintenance tasks being less than the determined available overhead. Once the overhead has been determined, any and all maintenance tasks must operate within the overhead in order to avoid pushing the system into a position where the operation of the system starts to degrade. Since the available overhead is calculated dynamically as the current workload varies, the amount of computing resources that can be assigned to the maintenance tasks will increase and decrease in relation to the workload, but without affecting the overall system performance.

As discussed above, in an illustrative embodiment, the calculation of a maximum workload for the set of computing components from the monitored use of the computing resources within the set of computing components comprises accessing a predefined unacceptable latency for the set of computing components and estimating the workload that would lead to the predefined unacceptable latency. A defined unacceptable latency can be used as the determining factor for the maximum workload that the system can accept without suffering any degradation in performance. As the workload on the system increases, the latency of the system can be tracked and the management component 14 can use this to extrapolate a maximum workload.

Figure 6:
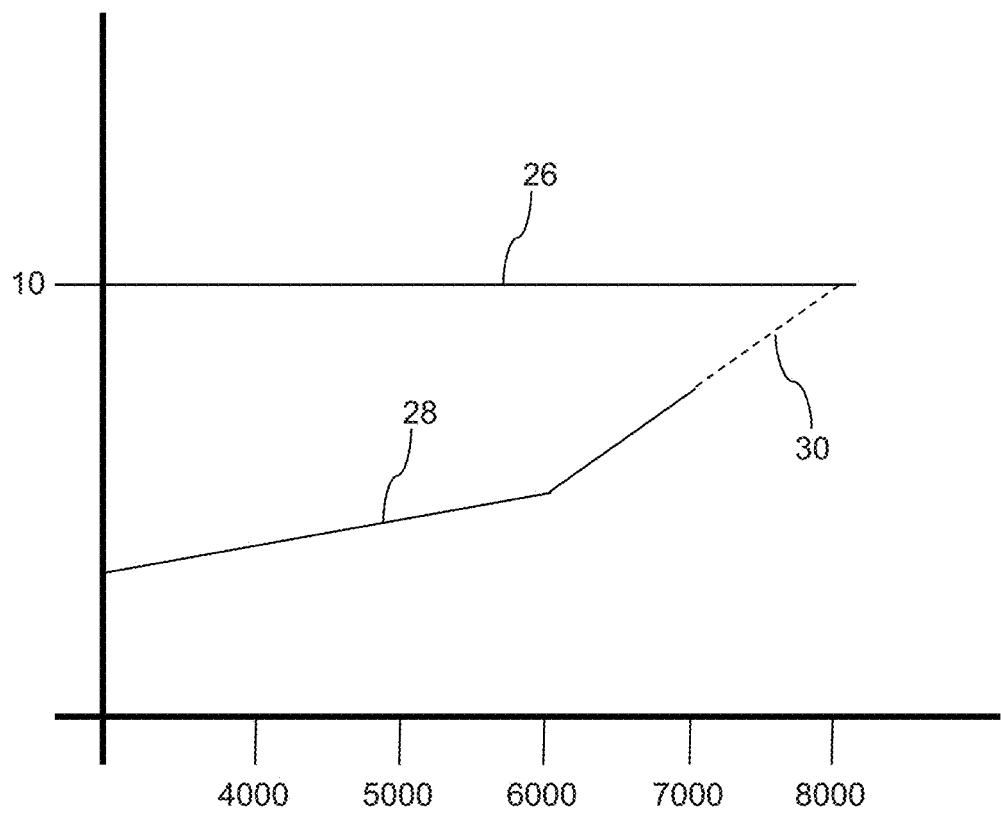
FIG. 6 is a chart showing a latency limit for a computing system in accordance with an illustrative embodiment.

FIG. 6 shows a chart which plots the latency (y-axis) of the system of FIG. 1 against IOPs received (x-axis), in a chart similar to that of FIG. 4. On the chart, a threshold 26 indicates a maximum acceptable latency and the solid line 28 (the actual system performance) can be seen to be approaching this threshold 26 from the performance measured by the management component 14. The management component 14 can extrapolate the performance of the system from the known data to estimate the maximum workload of the system, as indicated by the dotted line 30 and this level can be used as the basis for determining the available overhead in the system relative to the current workload that can then be used for selecting the maintenance tasks.

In this case, the received workload and the maximum workload are measured in IOPs (input/output operations per second) and the determined available overhead comprises a maximum IOPs available for the one or more selected maintenance tasks. The management component 14 knows the likely IOPs used for each maintenance task and can select tasks according to the available IOPs detailed by the available overhead. The management component 14 is able to execute the selected maintenance tasks, monitor the workload generated by the executing maintenance tasks, and throttle the execution of the maintenance tasks if the monitored workload generated by the executing maintenance tasks exceeds the determined available overhead. As the maintenance tasks are being executed on the system, the management component 14 can monitor the performance of these tasks and adjust their operation if necessary, if the maintenance tasks start to consume too much available resources, relative to the overhead available for those maintenance tasks.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method comprising:
  monitoring usage of one or more computing resources within a set of computing components relative to a received workload;
  calculating a maximum workload for the set of computing components from the monitored usage of the computing resources within the set of computing components, wherein calculating the maximum workload for the set of computing components comprises accessing a predefined unacceptable latency for the set of computing components and extrapolating the monitored usage of the one or more computing resources to estimate a workload that would lead to the predefined unacceptable latency, wherein the received workload and the maximum workload are measured in IOPs (input/output operations per second), and wherein the determined available overhead comprises a maximum IOPs available for the selected one or more maintenance tasks;

determining an available overhead between the calculated maximum workload for the set of computing components and a current workload being performed by the set of computing components;

selecting one or more maintenance tasks for the set of computing components, the total workload of the selected maintenance tasks being less than the determined available overhead; and responsive to detecting higher-bandwidth network links, more disks, or faster disks, adjusting an amount of resource to be used by maintenance systems.

2. The method of claim 1, further comprising continually monitoring usage of the one or more computing resources within the set of computing components relative to a received workload and recalculating the maximum workload for the set of computing components from the monitored usage of the computing resources within the set of computing components.

3. The method of claim 1, further comprising executing the selected one or more maintenance tasks, monitoring the workload generated by the selected one or more maintenance tasks, and throttling execution of the selected one or more maintenance tasks responsive to determining the monitored workload generated by the selected one or more maintenance tasks exceeds the determined available overhead.

4. The method of claim 1, wherein the one or more maintenance tasks comprise a data backup.

5. The method of claim 1, further comprising throttling execution of the one or more maintenance tasks responsive to determining that monitored workload generated by executing the one or more maintenance tasks exceeds the determined available overhead.

6. A system comprising:
a processor; and
a memory coupled to the processor, wherein the memory comprises instructions which, when executed by the processor, cause the processor to:
monitor usage of one or more computing resources within a set of computing components relative to a received workload;
calculate a maximum workload for the set of computing components from the monitored usage of the computing resources within the set of computing components, wherein calculating the maximum workload for the set of computing components comprises accessing a predefined unacceptable latency for the set of computing components and extrapolating the monitored usage of the one or more computing resources to estimate a workload that would lead to the predefined unacceptable latency, wherein the received workload and the maximum workload are measured in IOPs (input/output operations per second), and wherein the determined available overhead comprises a maximum IOPs available for the selected one or more maintenance tasks;
determine an available overhead between the calculated maximum workload for the set of computing components and a current workload being performed by the set of computing components;
select one or more maintenance tasks for the set of computing components, the total workload of the selected maintenance tasks being less than the determined available overhead; and
responsive to detecting higher-bandwidth network links, more disks, or faster disks, adjust an amount of resource to be used by maintenance systems.

7. The system of claim 6, wherein the instructions further cause the processor to continually monitor usage of the one or more computing resources within the set of computing components relative to a received workload and recalculate a maximum workload for the set of computing components from the monitored usage of the computing resources within the set of computing components.

8. The system of claim 6, wherein the instructions further cause the processor to execute the selected one or more maintenance tasks, monitor the workload generated by the selected one or more maintenance tasks, and throttle execution of the selected one or more maintenance tasks responsive to determining the monitored workload generated by the selected one or more maintenance tasks exceeds the determined available overhead.

9. The system of claim 6, wherein the one or more maintenance tasks comprise a data backup.

10. The system of claim 6, wherein instructions further cause the processor to throttle execution of the one or more maintenance tasks responsive to determining that monitored workload generated by executing the one or more maintenance tasks exceeds the determined available overhead.

11. A computer program product for controlling a system, the computer program product comprising a computer readable storage medium having program instructions embodied therewith, the program instructions executable by a processor to cause the processor to:
monitor usage of one or more computing resources within a set of computing components relative to a received workload;
calculate a maximum workload for the set of computing components from the monitored use of the computing resources within the set of computing components, wherein calculating the maximum workload for the set of computing components comprises accessing a predefined unacceptable latency for the set of computing components and extrapolating the monitored usage of the one or more computing resources to estimate a workload that would lead to the predefined unacceptable latency, wherein the received workload and the maximum workload are measured in IOPs (input/output operations per second), and wherein the determined available overhead comprises a maximum IOPs available for the selected one or more maintenance tasks;
determine an available overhead between the calculated maximum workload for the set of computing components and a current workload being performed by the set of computing components;
select one or more maintenance tasks for the set of computing components, the total workload of the selected one or more maintenance tasks being less than the determined available overhead; and
responsive to detecting higher-bandwidth network links, more disks, or faster disks, adjust an amount of resource to be used by maintenance systems.

12. The computer program product of claim 11, wherein the program instructions further cause the processor to continually monitor usage of the one or more computing resources within the set of computing components relative to a received workload and recalculate the maximum workload for the set of computing components from the monitored usage of the computing resources within the set of computing components.

13. The computer program product of claim 11, wherein the program instructions further cause the processor to execute the selected one or more maintenance tasks, monitor the workload generated by the selected one or more maintenance tasks, and throttle execution of the selected one or more maintenance tasks responsive to determining the monitored workload generated by the selected one or more maintenance tasks exceeds the determined available overhead.

14. The computer program product of claim 11, wherein the one or more maintenance tasks comprise a data backup.

15. The computer program product of claim 11, wherein instructions further cause the processor to throttling execution of the one or more maintenance tasks responsive to determining that monitored workload generated by executing the one or more maintenance tasks exceeds the determined available overhead.

\* \* \* \* \*